(12) United States Patent
Jober

(10) Patent No.: US 6,553,010 B1
(45) Date of Patent: Apr. 22, 2003

(54) COVERAGE DETECTION AND INDICATION IN MULTIMEDIA RADIOCOMMUNICATION SYSTEM

(75) Inventor: Johan Jober, Funakawa-machi (JP)

(73) Assignee: Telefonaktiebolaget L M Ericsson, Stockholm (SE)

( * ) Notice: Subject to any disclaimer, the term of this patent is extended or adjusted under 35 U.S.C. 154(b) by 0 days.

(21) Appl. No.: 09/173,716

(22) Filed: Oct. 16, 1998

(51) Int. Cl.[7] .................................................. H04Q 7/00
(52) U.S. Cl. ........................................ 370/328; 370/442
(58) Field of Search ................................ 370/310, 332, 370/333, 318, 328, 329, 341, 342, 441, 442, 468, 479, 491; 375/130, 142, 150; 455/134, 135, 136, 138, 418, 420, 456, 464, 515, 522, 524, 525, 62, 67.1, 68, 69

(56) References Cited

U.S. PATENT DOCUMENTS

| | | | |
|---|---|---|---|
| 5,257,408 A | | 10/1993 | Olson et al. |
| 5,581,802 A | * | 12/1996 | Erickson et al. ............. 455/510 |
| 5,613,213 A | * | 3/1997 | Naddell et al. .............. 455/414 |
| 5,644,590 A | | 7/1997 | Sugita |
| 5,655,003 A | * | 8/1997 | Erving et al. ................ 379/418 |
| 5,697,053 A | * | 12/1997 | Hanly .......................... 375/130 |
| 5,729,557 A | | 3/1998 | Gardner et al. |
| 5,745,521 A | | 4/1998 | Sugita |
| 5,818,871 A | | 10/1998 | Blakeney, II et al. |
| 5,898,696 A | * | 4/1999 | Proctor et al. ............... 370/468 |
| 5,974,042 A | * | 10/1999 | Frank et al. ................. 370/342 |
| 6,434,130 B1 | * | 8/2002 | Soininen et al. ............ 370/331 |

FOREIGN PATENT DOCUMENTS

| | | |
|---|---|---|
| JP | 09235913 | 9/1995 |
| JP | 09172428 | 6/1997 |
| JP | 09219697 | 8/1997 |
| WO | WO98/19405 | 5/1998 |

\* cited by examiner

*Primary Examiner*—Douglas Olms
*Assistant Examiner*—Phirin Sam
(74) *Attorney, Agent, or Firm*—Burns, Doane, Swecker & Mathis, L.L.P.

(57) ABSTRACT

Whether a service is available for use by a mobile station in a radiocommunication system is ascertained by determining a quality value that represents the mobile station's transmission power capability that is above an amount of transmission power that will be consumed by known losses for the service and determining whether the service is available for use by the mobile station on the basis of a comparison between the quality value and a predetermined number. The quality value may be determined by subtracting the amount of transmission power that will be consumed by known losses for the service from a maximum available power that the mobile station can deliver. Known losses may include the power loss on a channel between the mobile station and a base station, the amount of power that is needed to overcome interference, and the amount of power needed to accommodate the service. The determination of whether the service is available may be displayed to a user of the mobile station, and may be used to activate or abort activation of the service.

28 Claims, 3 Drawing Sheets

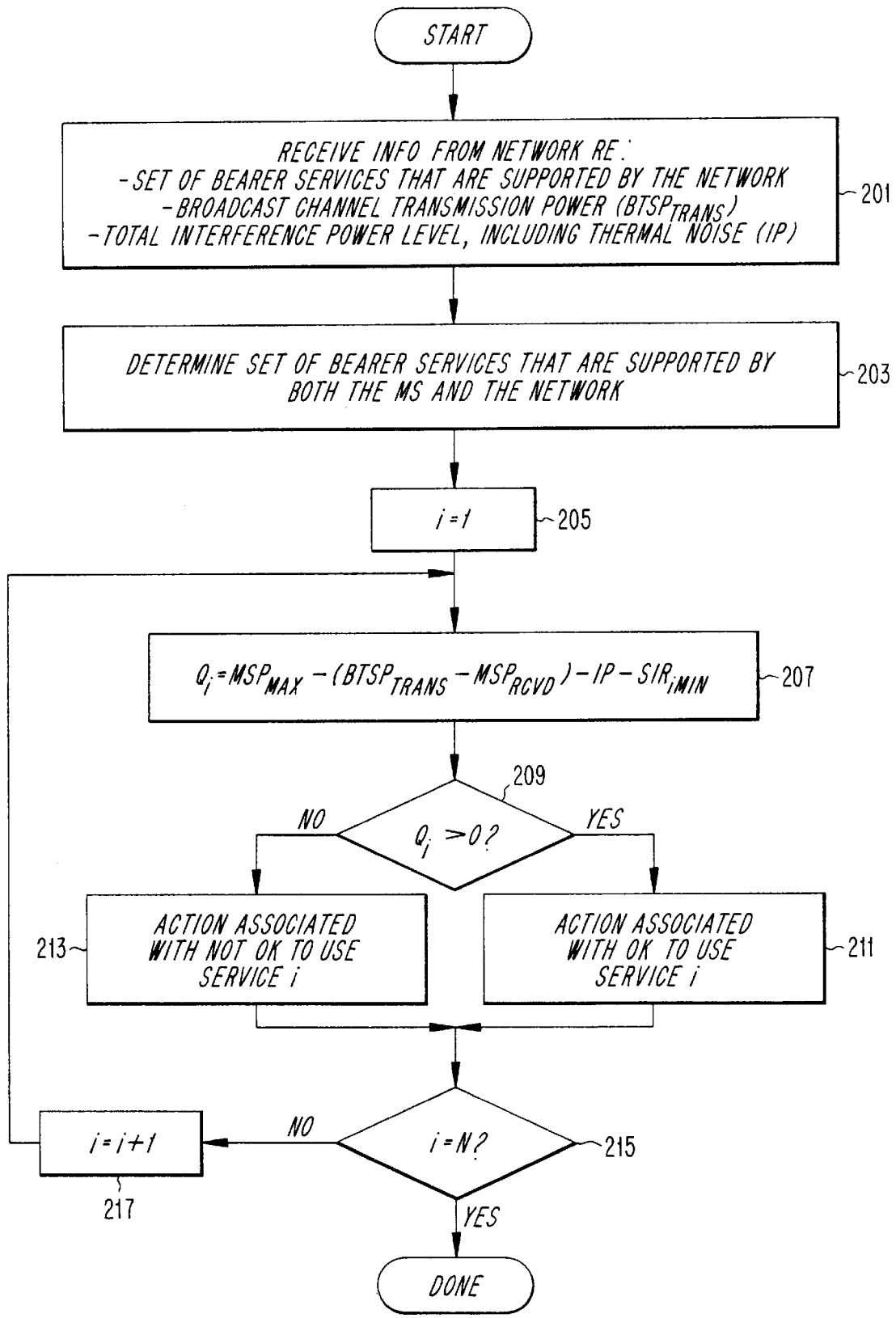

COVERAGE DETECTION AND INDICATION IN MULTIMEDIA RADIOCOMMUNICATION SYSTEM

BACKGROUND

The present invention relates generally to radiocommunication systems, and more particularly to the use of Code Division Multiple Access (CDMA) communication techniques in a radio communication system. The invention relates even more particularly to methods and apparatuses for determining an existing level of service capability in a CDMA system.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as to maintain high quality service and avoid rising prices.

Throughout the world, one important step in the advancement of radio communication systems is the change from analog to digital transmission. Equally significant is the choice of an effective digital transmission scheme for implementing next generation technology. Furthermore, it is widely believed that the first generation of Personal Communication Networks (PCNs), employing low cost, pocket-sized, cordless telephones that can be carried comfortably and used to make or receive calls in the home, office, street, car, and the like, will be provided by, for example, cellular carriers using the next generation digital cellular system infrastructure. An important feature desired in these new systems is increased traffic capacity, and efficient use of this capacity.

Currently, channel access is very often achieved using Frequency Division Multiple Access (FDMA) and Time Division Multiple Access (TDMA) methods. In FDMA, a communication channel is a single radio frequency band into which a signal's transmission power is concentrated. Signals that can interfere with a communication channel include those transmitted on adjacent channels (adjacent channel interference) and those transmitted on the same channel in other cells (co-channel interference). Interference with adjacent channels is limited by the use of band pass filters which only pass signal energy within the specified frequency band. Co-channel interference is reduced to tolerable levels by restricting channel reuse such that a minimum separation distance is required to exist between cells in which the same frequency channel is used. Thus, with each channel being assigned a different frequency, system capacity is limited by the available frequencies as well as by limitations imposed by channel reuse.

In TDMA systems, a channel consists of, for example, a time slot in a periodic train of time intervals over the same frequency. Each period of time slots is called a frame. A given signal's energy is confined to one of these time slots on a given frequency. Adjacent channel interference is limited by the use of a time gate or other synchronization element that only passes signal energy received at the proper time. Thus, with each channel being assigned a different time slot, system capacity is limited by the number of available time slots as well as by limitations imposed by channel reuse as described above with respect to FDMA.

With FDMA and TDMA systems (as well as hybrid FDMA/TDMA systems), one goal of system designers is to ensure that two potentially interfering signals do not occupy the same frequency at the same time. In contrast, Code Division Multiple Access (CDMA) is a channel access technique that allows signals to overlap in both time and frequency. CDMA is a type of spread spectrum communication technique, which has been around since the days of World War II. Early applications were predominantly military oriented. However, today there has been an increasing interest in using spread spectrum systems in commercial applications because spread spectrum communications provide robustness against interference, which allows for multiple signals to occupy the same bandwidth at the same time. Examples of such commercial applications include digital cellular radio, land mobile radio, and indoor and outdoor personal communication networks.

In a CDMA system, each signal is transmitted using any of a number of spread spectrum techniques. In some variations of CDMA, the informational data stream to be transmitted is impressed upon a much higher rate data stream known as a signature sequence. Typically, the signature sequence data are binary, thereby providing a bit stream. One way to generate this signature sequence is with a pseudo-noise (PN) process that appears random, but can be replicated by an authorized receiver. The informational data stream and the high bit rate signature sequence stream are combined by multiplying the two bit streams together, assuming the binary values of the two bit streams are represented by +1 or −1. This combination of the higher bit rate signal with the lower bit rate data stream is called spreading the informational data stream signal. Each informational data stream or channel is allocated a unique signature sequence.

A plurality of spread information signals modulate a radio frequency carrier, for example by binary phase shift keying (BPSK), and are jointly received as a composite signal at the receiver. Each of the spread signals overlaps all of the other spread signals, as well as noise-related signals, in both frequency and time. If the receiver is authorized, then the composite signal is correlated with one of the unique signature sequences, and the corresponding information signal can be isolated and despread. If quadrature phase shift keying (QPSK) modulation is used, then the signature sequence may consist of complex numbers (having real and imaginary parts), where the real and imaginary parts are used to modulate respective ones of two carriers at the same frequency, but ninety degrees out of phase with respect to one another.

Traditionally, a signature sequence is used to represent one bit of information. Receiving the transmitted sequence or its complement indicates whether the information bit is a +1 or −1, sometimes denoted "0" or "1". The signature sequence usually comprises N bits, and each bit of the signature sequence is called a "chip". The entire N-chip sequence, or its complement, is referred to as a transmitted symbol. The conventional receiver, such as a RAKE receiver, correlates the received signal with the complex conjugate of the known signature sequence to produce a correlation value. Only the real part of the correlation value is computed. When a large positive correlation results, a "0" is detected; when a large negative correlation results, a "1" is detected.

The "information bits" referred to above can also be coded bits, where the code used is a block or convolutional code. Also, the signature sequence can be much longer than a single transmitted symbol, in which case a sub-sequence of the signature sequence is used to spread the information bit. In many radio communication systems, the received signal includes two components: an in-phase (I) component and a quadrature (Q) component. This occurs because the transmitted signal has two components (e.g., QPSK), and/or the intervening channel or lack of coherent carrier reference causes the transmitted signal to be divided into I and Q components. In a typical receiver using digital signal processing, the received I and Q component signals are sampled and stored at least every $T_c$ seconds, where $T_c$ is the duration of a chip.

CDMA techniques exist in a number of variants. Direct-sequence CDMA (DS-CDMA) operates as described above. Consequently, in DS-CDMA, the broadband frequency channel can be reused in every adjacent cell. Frequency-hopping techniques can also be employed to yield CDMA systems (FH-CDMA). Here, the hopping pattern can be formed as a code sequence. That is, a bit is sent on a pseudo-random pattern of frequency channels, and each subsequent bit is sent on a different pseudo-random pattern of frequency channels. The multiple frequency channels form a code for one bit. The code may be sent out simultaneously or sequentially. A larger bandwidth is required if each bit is to be sent out on the different frequency channels simultaneously, compared to the conventional FH-CDMA strategy of sending bits over frequency channels sequentially.

The traffic capacity of a CDMA system can be increased by managing power intelligently within the cell. Even with intelligent power management, however, there is an upper limit on the total amount of ongoing traffic that can take place in any one cell. This limit is related to the "processing gain", which represents the ratio of the bandwidth per channel to the information transmission rate. In CDMA, different processing gains are achieved, depending on the symbol rate and the coding scheme employed. The processing gain for a particular service also affects what coverage can be achieved for that service.

The information transmission rate is often not fixed within a system, but instead may vary in dependence on the type of service being provided. For example, one type of service, such as voice transmission, may require the capacity to transmit at one information rate, while other services (such as movies, single picture, hi-fi music, fax and data) may each require the capacity to transmit information at very different rates. It is essential for a cellular subscriber to know if there is coverage at his present location for a particular service that he may wish to use.

Presently, second generation cellular systems provide the user with a single signal strength detection and indication. However, this is not sufficient to indicate the coverage and availability of different services.

One way to deal with this problem is to compensate for the varying processing gain by requiring the mobile station (MS) (and presumably also the network) to utilize an output power level that is inversely proportional to the processing gain, that is, higher output power would be used for services that have a lower processing gain, and vice versa. This solution is problematic because it means that bearer services having a high processing gain are prevented from using the full output power capability of the MS. As a consequence, the coverage for these services is not as good as it could be.

SUMMARY

It is therefore an object of the present invention to provide methods and apparatuses that are capable of determining whether a service is available for use by a mobile station in a radiocommunication system.

It is another object of the invention to provide methods and apparatuses that are capable of determining an expected quality level of a service that is available for use by a mobile station in a radiocommunication system.

These and other objects are achieved in methods and apparatuses for determining whether a service is available for use by a mobile station in a radiocommunication system. In accordance with one aspect of the invention, this is achieved by determining a quality value that represents the mobile station's transmission power capability that is above an amount of transmission power that will be consumed by known losses for the service. Whether the service is available for use by the mobile station is then determined on the basis of a comparison between the quality value and a predetermined number.

In another aspect of the invention, the technique for determining the quality value comprises subtracting the amount of transmission power that will be consumed by known losses for the service from a maximum available power that the mobile station can deliver.

In other aspects of the invention, the known losses may include any combination of the following: the power loss on a channel between the mobile station and a base station; the amount of power that is needed to overcome interference; and the amount of power needed to accommodate the service.

In another aspect of the invention, after the determination is made, an indication of whether the service is available may be displayed on the mobile station.

In yet another aspect of the invention, after the determination is made, the quality value may be used as an indication of an expected quality of the service. This indication may be displayed on the mobile station.

In still another aspect of the invention, the service may be activated in response to a determination that the service is available for use by the mobile station.

In yet another aspect of the invention, an activation of the service may be aborted in response to a determination that the service is not available for use by the mobile station.

In still another aspect of the invention, the quality value may be used to determine whether to change operation of the mobile station from the service to a different service, or from a different service to the service.

BRIEF DESCRIPTION OF THE DRAWINGS

The objects and advantages of the invention will be understood by reading the following detailed description in conjunction with the drawings in which:

FIG. 2 is a flowchart of the steps carried out by a mobile station in accordance with one embodiment of the invention.

DETAILED DESCRIPTION

Figure 1:
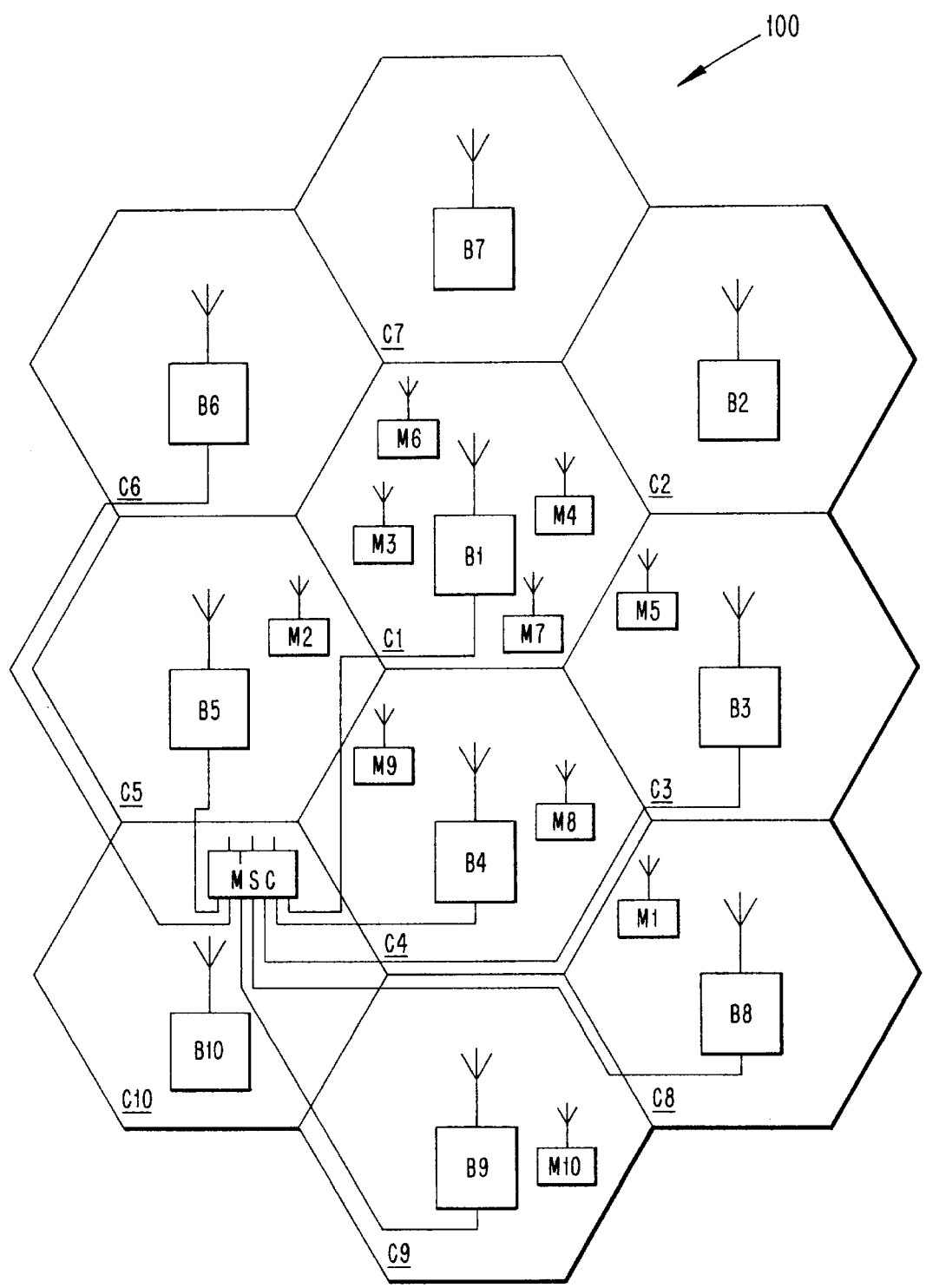
FIG. 1 is a schematic diagram illustrating the relationship between 10 cells in a cellular telephone network employing aspects of the invention.

The various features of the invention will now be described with respect to the figures, in which like parts are identified with the same reference characters.

FIG. 1 is a schematic diagram illustrating the relationship between 10 cells (C1–C10) in a typical cellular telephone network 300 (herein referred to as a "cellular network"). Generally, a cellular network would have far more than ten cells; however, ten is sufficient for illustrative purposes.

In each cell C1 to C10, there is a base station B1 to B10. It will be understood that although the base stations B1 to B10 are each depicted as a single system component (such as is found in systems designed in accordance with the D-AMPS standards), in some systems, such as those built in accordance with the Global System for Mobile communication (GSM) standards, the base stations B1 to B10 may themselves be organized into a hierarchy of subcomponents, such as base station controllers (BSCs), each coupled to one or more base transceiver stations (BTSs). In this case, only the BTSs are situated one to a cell. The BSCs, on the other hand, may be responsible for controlling the operation of the BTSs of several cells, and therefore need not be associated with only one cell.

Although FIG. 1 shows the base stations located toward the center of each cell, base stations may be located anywhere in the cell. Base stations located toward the center typically employ omni-directional antennas, while base stations located toward a cell boundary typically employ directional antennas.

The cellular network 100 depicted in FIG. 1 also has a mobile switching center (MSC). The MSC connects to each of the base stations by cable, radio links, or both (not illustrated in FIG. 1). The MSC is also connected to a fixed telephone switching unit (also not illustrated in FIG. 1). The mobiles M1–M10 represent the mobile telephone units. Of course, the mobiles can move about in one cell or they can move about from one cell to another cell. Typically, there are far more mobiles than ten. Again, showing ten mobiles is sufficient for illustrative purposes.

Each mobile station includes a receiver (also not illustrated in FIG. 1) for receiving signals transmitted over the air interface from a base station to which that mobile station is currently listening. The receiver processes the received information symbols, such as by using demodulation and detection techniques, to extract the information symbols included in the received signals. Each mobile station further includes a transmitter for sending signals to the base station.

As mentioned in the BACKGROUND section of this disclosure, radio communications between the base stations and the mobile stations may utilize any of a number techniques, such as CDMA, that enable the spectrum resources to be shared by a multiplicity of users. For any given one of these resource sharing techniques, there is a limit to the total amount of information (e.g., data bits) that can be communicated at any particular time at any particular location. Thus, the user of a mobile station is presented with the problem of how to determine whether present system conditions include the capacity to accommodate the information transmission rate associated with any of a number of services that the user may wish to activate.

As a solution to this problem, attention is first directed to Shannon's formula, which is well-known, and which may be stated as follows:

$$\frac{R}{B} < \log_{10}\left(1 + \frac{E_b R}{N_o B}\right)$$

where R is the rate of information transmission,
  B is the total bandwidth available for transmission of the information,
  $E_b$ is the energy used for transmitting each bit,
  and $N_o$ is the noise power level per Hertz (so that the quantity $N_o B$ is the total noise power).

It can be seen from Shannon's formula that each channel has a capacity C that will accommodate only up to a particular information transmission rate, and that this capacity C is dependent on the Signal to Interference Ratio (SIR). (Shannon's formula, as stated above, can be generalized in the case of, for example, CDMA to consider interfering signals as equivalent to noise power.) Thus, the ability of the system to provide any given service (e.g., movie, single picture, hi-fi music, fax, data and speech) that demands a certain minimum transmission rate depends on whether the SIR is large enough.

In accordance with one aspect of the invention, the quality of the transmission is predicted in the mobile station, and mapped onto the various requirements associated with the given services. In another aspect of the invention, the result may be displayed to the user, although alternative embodiments may forego this last step in favor of other steps that, for example, simply store the result for future use, or alternatively utilize the result automatically without the user's being specifically aware of it.

Turning now to FIG. 2, this is a flowchart of the steps carried out by a mobile station in an exemplary embodiment of the invention. Means for performing the various steps may be in the form of a programmable processor executing a program stored in a memory device, coupled with other known elements for receiving and extracting information from radio transmissions. In alternative embodiments, hard-wired circuits may be substituted for the programmable processor.

In the exemplary embodiment, the network broadcasts (e.g., from the BS's) information informing of the set of bearer services that it is capable of handling; the broadcast channel transmission power ($BTSP_{TRANS}$), and the total interference power level including thermal noise (IP). Thus, at step 201, the mobile station receives this information.

The mobile station is aware of its own capabilities to process the different services. For example, this information may be stored in a non-volatile memory that is part of the mobile station. Because the mobile station and the network may support different sets of bearer services, the mobile station determines the set of N bearer services that are commonly supported by itself and the network (step 203). It will be recognized that in alternative embodiments, the system can be designed such that the mobile station and the network always support the same bearer services. In these cases, step 203 may be omitted.

Next, a loop-counter variable i is initialized to 1. In the following steps, this value will be repeatedly adjusted so that it will serve as an index for each of the N bearer services.

For each bearer service i, a corresponding quality measurement $Q_i$ is determined in accordance with the following equation:

$$Q_i = MSP_{MAX} - (BTSP_{TRANS} - MSP_{RCVD}) - IP - SIR_{iMIN}$$

(values in dB or dBm)
where
  $MSP_{MAX}$ is the maximum power that the mobile station is capable of delivering.
  $BTSP_{TRANS}$ is the actual transmission power sent from the base station. As stated above, this value is broadcast to the mobile stations from the base stations.
  $MSP_{RCVD}$ is the received power level measured at the mobile station. The received power level corresponds to that which remains of $BTSP_{TRANS}$. It should therefore be measured on the same channel as the one that $BTSP_{TRANS}$ relates to. For example, in CDMA $MSP_{RCVD}$ should be measured for the same code, which more generally can be described as a channel. Techniques and apparatuses for measuring received power levels are well-known in the art, and need not be described here in detail.

IP is the power of the actual interference, including thermal noise. As stated above, this value is broadcast to the mobile stations from the base stations.

$SIR_{MIN}$ is the minimum required signal to interference ratio that is necessary to support the corresponding bearer service i.

Examining this formula, it can be seen that the quantity ($BTSP_{TRANS}$–$MSP_{RCVD}$) is the difference between the actual transmission power sent from the base station and the received power level measured at the mobile station, and thus represents the power loss on the channel. Overall, then, the quality value $Q_i$ is the available power at the mobile station, minus the amount of power lost on the channel, minus the power that is needed to overcome interference, minus the amount of power needed to accommodate the ith bearer service. Stated more generally, the quality value $Q_i$ represents the mobile station's transmission power capability that is above the amount of transmission power that will be consumed by known losses for the ith bearer service.

Next, the quality value $Q_i$ is compared with the value zero (step 209). If it is greater than zero (meaning that after accounting for the various power losses described above, the mobile station will have remaining transmission power capability), then the mobile station performs one or more actions that are associated with it being all right to use bearer service i. Such actions may, for example, include displaying or otherwise presenting this information to the user. Alternatively, the actions may include merely saving the information for later use, or even activating or initiating the bearer service i. In yet another alternative, the action may include changing operation of the mobile station from one service to another service. The particular actions to be performed are application specific, so that a complete description of this aspect of the invention is beyond the scope of this disclosure.

Returning to decision step 209, if the quality value $Q_i$ is not greater than zero (meaning that after accounting for the various power losses described above, the mobile station will have no remaining power transmission power capability), then the mobile station performs one or more actions that are associated with it not being all right to use bearer service i. Such actions may, for example, include displaying or otherwise presenting this information to the user. Alternatively, the actions may include merely saving the information for later use, or even stopping a requested activation of the bearer service i. In yet another alternative, the action may include changing operation of the mobile station from one service to another service. The particular actions to be performed in this case are application specific, so that a complete description of this aspect of the invention is beyond the scope of this disclosure.

Regardless of the outcome of decision step 209, processing next continues at decision step 215, in which the index variable i is tested to see whether it equals the total number, N, of bearer services that are commonly supported by the network and the mobile station. If i equals N, then a quality value $Q_i$ has been determined and tested for each of the commonly supported bearer services, so processing is complete. If the result obtained from decision block 215 is "NO", then the index variable i is adjusted (step 217), and the loop is repeated for the next bearer service, beginning at block 207.

It will be apparent to those skilled in the art that the particular steps illustrated in FIG. 2 are by no means the only possible embodiment of the invention. For example, the loop determines a quality value $Q_i$ for an ith one of the N commonly supported bearer services, and then tests the quality value and acts accordingly for the ith bearer service, all before going on to perform these steps of the i+1:th bearer service. However, there is nothing inherently special about the illustrated order of steps in the loop, and these could easily be rearranged in many ways to accomplish the same result. Furthermore, the equation for the quality value $Q_i$ itself is merely intended as an illustration of one accounting for known power losses in an exemplary system. In other systems, however, the known power losses may derive from a different set of known losses, so that determining the quality value $Q_i$ would entail subtracting this different set of power losses from the maximum available power that the mobile station can deliver.

It will also be apparent that in alternative embodiments, the quality value $Q_i$ need not be expressly compared to a predetermined value to determine whether a particular service is available. Rather, in such embodiments, the quality value may merely be used as a measure of expected quality of the corresponding service.

Each of the above-described embodiments indicates that the determination of the quality value $Q_i$ is made in the mobile station. However, in alternative embodiments, this determination can instead by carried out somewhere in the network (e.g., at a base station) if the necessary parameters ($MSP_{MAX}$ and $MSP_{RCVD}$) are transmitted to or otherwise obtained by that network location from the mobile station.

Figure 3A:
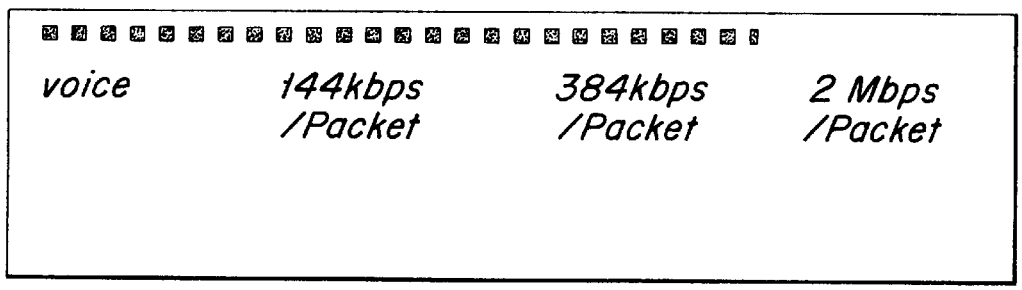
FIGS. 3a and 3b illustrate alternative displays for visually presenting information about the availability of a number of bearer services to the user, in accordance with another aspect of the invention.
Figure 3B:
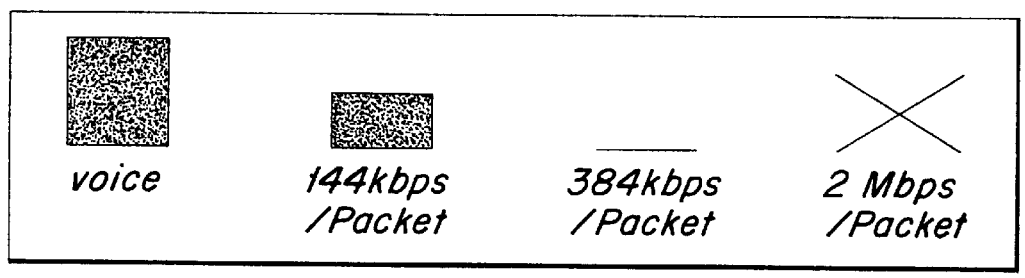

In another aspect of the invention, the actions performed in response to the testing of the quality value $Q_i$ (e.g., step 209) may include presenting this information to the user. FIGS. 3*a* and 3*b* illustrate two alternative displays for presenting this information visually. Here it is assumed that there are four services (i=1 to 4) that represent the bit rate for either circuit switched voice or data and packet data. In FIG. 3*a*, the available services and expected quality can be judged from a bar representing the quality ($Q_i$) relative to a basic service (i=1), which in this example is voice. The four supported services are displayed (in this case) horizontally with respect to one another, with the distance between indicated service representing the difference in processing gain (difference in $SIR_{iMIN}$). If a particular bearer service is not represented by the network or by the MS, then it is not indicated on the display.

In FIG. 3*b*, the expected quality and availability are presented for each service. In this case, the height of each bar represents the quality value $Q_i$ of the corresponding bearer service. If the quality value $Q_i$ is negative, or the network or MS does not support the service, this may be indicated by a special symbol, such as the cross "X" depicted in connection with the 2 Mbps/Packet bearer service. Alternatively, the icon associated with such a service could simply not be displayed to the user.

In each of FIGS. 3*a* and 3*b*, it can be seen that the display formats permit a user to not only learn of the present availability and quality of several services at the same time, but also to see how much better (or worse) one service is expected to be than another.

In preferred embodiments, an indication of expected quality and/or availability of one or more services is continuously presented to the user. In order to keep this information current, the determination of the quality value $Q_i$ can be carried out in conjunction with the mobile station's cell search activity during idel mode (no call ongoing) or active mode (call ongoing).

The above-described techniques for detecting coverage for a particular set of bearer services has an advantage in that the full output power of the mobile station can be used for all services. Furthermore, it is still possible for the subscriber to understand what services are available at any given time.

The invention has been described with reference to a particular embodiment. However, it will be readily apparent to those skilled in the art that it is possible to embody the invention in specific forms other than those of the preferred embodiment described above. This may be done without departing from the spirit of the invention. For example, in the exemplary embodiments the quality value, $Q_i$, is compared to a value of zero in order to determine whether a particular service is available for use by the mobile station. However, in alternative embodiments, it may be advantageous to make this determination by comparing the quality value to predetermined values other than zero.

In other alternative embodiments, additional application-specific limitations and constraints can also be considered before judging that a service is available, or even to further refine the quality value. Examples of such application-specific additional constraints are: the maximum amount of interference power that the base station can handle; and the amount of output power from the BTS that remains for new services.

In yet other alternative embodiments, the roles of the mobile station and the BTS may simply be reversed. For example, the mobile station may measure total interference power, including noise and the like, and report this to the BTS. The BTS then calculates expected quality and determines the availability of each service towards that particular mobile station based on the maximum output power of the base station that can be dedicated to a specific mobile station. The embodiment can be used independently of, or in combination with the embodiments described earlier.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of determining whether a service is available for use by a mobile station in a radiocommunication system, the method comprising the steps of:
   determining a quality value that represents the mobile station's transmission power capability that is above an amount of transmission power that will be consumed by known losses for the service; and
   determining whether the service is available for use by the mobile station on the basis of a comparison between the quality value and a predetermined number, wherein the step of determining the quality value comprises the step of subtracting the amount of transmission power that will be consumed by known losses for the service from a maximum available power that the mobile station can deliver.

2. The method of claim 1, wherein the known losses for the service include a power loss on a channel between the mobile station and a base station.

3. The method of claim 2, further comprising the steps of:
   receiving a value representing an actual transmission power sent from the base station;
   measuring a received power level at the mobile station; and
   determining the power loss on the channel between the mobile station and the base station by subtracting the received power level from the value representing the actual transmission power sent from the base station.

4. The method of claim 1, wherein the known losses for the service include an amount of power that is needed to overcome interference.

5. The method of claim 1, wherein the known losses for the service include an amount of power needed to accommodate the service.

6. The method of claim 1, further comprising the step of determining that the service is commonly supported by the mobile station and a base station in the radiocommunication system.

7. The method of claim 1, further comprising the step of displaying on the mobile station an indication of whether the service is available for use by the mobile station.

8. The method of claim 1, further comprising the step of using the quality value to display on the mobile station an indication of expected quality of the service for use by the mobile station.

9. The method of claim 1, further comprising the step of activating the service in response to a determination that the service is available for use by the mobile station.

10. The method of claim 1, further comprising the step of aborting an activation of the service in response to a determination that the service is not available for use by the mobile station.

11. The method of claim 1, further comprising the step of using the quality value to determine whether to change operation of the mobile station from the service to a different service.

12. The method of claim 1, wherein the service is a first service, and further comprising the step of using the quality value to determine whether to change operation of the mobile station from a second service to the first service.

13. A method of determining whether a service is available for use by a mobile station in a radio communication system, the method comprising the steps of:
   determining a quality value that represents the mobile station's transmission power capability that is above an amount of transmission power that will be consumed by known losses for the service;
   determining whether the service is available for use by the mobile station on the basis of a comparison between the quality value and a predetermined number;
   displaying on the mobile station a first indication of whether the service is available for use by the mobile station; and
   displaying on the mobile station a second indication of whether at least one other service is available for use by the mobile station,
   wherein the first and second indications are displayed simultaneously.

14. A method of determining whether a service is available for use by a mobile station in a radiocommunication system, the method comprising the steps of:
   determining a quality value that represents the mobile station's transmission power capability that is above an amount of transmission power that will be consumed by known losses for the service;
   determining whether the service is available for use by the mobile station on the basis of a comparison between the quality value and a predetermined number;
   using the quality value to display on the mobile station a first indication of expected quality of the service for use by the mobile station; and
   using at least one other quality value to display on the mobile station a second indication of expected quality of a respective one of at least one other service for use by the mobile station, wherein the first and second indications are displayed simultaneously.

15. An apparatus for determining whether a service is available for use by a mobile station in a radiocommunication system, the apparatus comprising:

means for determining a quality value that represents the mobile station's transmission power capability that is above an amount of transmission power that will be consumed by known losses for the service; and means for determining whether the service is available for use by the mobile station on the basis of a comparison between the quality value and a predetermined number, wherein the means for determining the quality value comprises means for subtracting the amount of transmission power that will be consumed by known losses for the service from a maximum available power that the mobile station can deliver.

16. The apparatus of claim 15, wherein the known losses for the service include a power loss on a channel between the mobile station and a base station.

17. The apparatus of claim 16, further comprising:

means for receiving a value representing an actual transmission power sent from the base station;

means for measuring a received power level at the mobile station; and means for determining the power loss on the channel between the mobile station and the base station by subtracting the received power level from the value representing the actual transmission power sent from the base station.

18. The apparatus of claim 15, wherein the known losses for the service include an amount of power that is needed to overcome interference.

19. The apparatus of claim 15, wherein the known losses for the service include an amount of power needed to accommodate the service.

20. The apparatus of claim 15, further comprising means for determining that the service is commonly supported by the mobile station and a base station in the radiocommunication system.

21. The apparatus of claim 15, further comprising means for displaying on the mobile station an indication of whether the service is available for use by the mobile station.

22. The apparatus of claim 15, further comprising means for using the quality value to display on the mobile station an indication of expected quality of the service for use by the mobile station.

23. The apparatus of claim 15, further comprising means for activating the service in response to a determination that the service is available for use by the mobile station.

24. The apparatus of claim 15, further comprising means for aborting an activation of the service in response to a determination that the service is not available for use by the mobile station.

25. The apparatus of claim 15, further comprising means for using the quality value to determine whether to change operation of the mobile station from the service to a different service.

26. The apparatus of claim 15, wherein the service is a first service, and further comprising means for using the quality value to determine whether to change operation of the mobile station from a second service to the first service.

27. An apparatus for determining whether a service is available for use by a mobile station in a radio communication system, the apparatus comprising:

means for determining a quality value that represents the mobile station's transmission power capability that is above an amount of transmission power that will be consumed by known losses for the service;

means for determining whether the service is available for use by the mobile station on the basis of a comparison between the quality value and a predetermined number;

means for displaying on the mobile station a first indication of whether the service is available for use by the mobile station; and means for displaying on the mobile station a second indication of whether at least one other service is available for use by the mobile station, wherein the first and second indications are displayed simultaneously.

28. An apparatus for determining whether a service is available for use by a mobile station in a radio communication system, the apparatus comprising:

means for determining a quality value that represents the mobile station's transmission power capability that is above an amount of transmission power that will be consumed by known losses for the service;

means for determining whether the service is available for use by the mobile station on the basis of a comparison between the quality value and a predetermined number;

means for using the quality value to display on the mobile station a first indication of expected quality of the service for use by the mobile station; and means for using at least one other quality value to display on the mobile station a second indication of expected quality of a respective one of at least one other service for use by the mobile station, wherein the first and second indications are displayed simultaneously.

* * * * *